United States Patent [19]
Nakano et al.

[11] Patent Number: 5,969,464
[45] Date of Patent: *Oct. 19, 1999

[54] DRIVE DEVICE USING ELECTROMECHANICAL TRANSDUCER AND AN APPARATUS EMPLOYING THE DRIVE DEVICE

[75] Inventors: Haruyuki Nakano; Satoshi Shinke, both of Sakai; Ryuichi Yoshida, Sagamihara; Yasuhiro Okamoto, Tondabayashi, all of Japan

[73] Assignee: Minolta Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/840,825

[22] Filed: Apr. 16, 1997

[30] Foreign Application Priority Data

| Apr. 18, 1989 | [JP] | Japan | 8-119515 |
| Apr. 18, 1996 | [JP] | Japan | 8-119513 |
| Apr. 18, 1996 | [JP] | Japan | 8-119514 |
| Apr. 18, 1996 | [JP] | Japan | 8-119516 |
| Feb. 20, 1997 | [JP] | Japan | 9-051133 |

[51] Int. Cl.$^6$ .................................................. H02N 2/00
[52] U.S. Cl. ...................... 310/328; 310/316.01; 310/317
[58] Field of Search ............................. 310/316, 317, 310/328, 316.01

[56] References Cited

U.S. PATENT DOCUMENTS

| 4,195,243 | 3/1980 | Thaxter | 310/317 |
| 4,570,096 | 2/1986 | Hara et al. | 310/328 |
| 4,578,607 | 3/1986 | Tojo et al. | 310/328 |
| 4,947,077 | 8/1990 | Murata | 310/328 |
| 5,013,955 | 5/1991 | Hara et al. | 310/316 |
| 5,144,187 | 9/1992 | Culp | 310/328 |
| 5,225,941 | 7/1993 | Saito et al. | 310/311 |
| 5,281,899 | 1/1994 | Culp | 310/316 |
| 5,343,108 | 8/1994 | Miyazawa et al. | 310/323 |
| 5,453,653 | 9/1995 | Zumeris | 310/323 |
| 5,587,846 | 12/1996 | Miyano et al. | 310/317 |
| 5,589,723 | 12/1996 | Yoshida et al. | 310/328 |
| 5,640,063 | 6/1997 | Zumeris et al. | 310/328 |

FOREIGN PATENT DOCUMENTS

| 0 179 978 | 5/1986 | European Pat. Off. | 310/317 |
| 52-35994 | 3/1977 | Japan | 310/328 |
| 62-93988 | 4/1987 | Japan | 310/317 |
| 4-69070 | 3/1992 | Japan | 310/317 |
| 8-23686 | 5/1994 | Japan | 310/328 |

*Primary Examiner*—Thomas M. Dougherty
*Attorney, Agent, or Firm*—Burns, Doane, Swecker & Mathis, LLP

[57] ABSTRACT

A drive device which repeats charging and discharging at different velocities by applying drive pulses to a piezoelectric transducer, causes vibrations with different velocities in the piezoelectric transducer to cause contraction and expansion displacements in a driving member fixedly coupled with the piezoelectric transducer for moving a member frictionally coupled to the driving member. In order to provide stable driving force, stable driving velocity and precise movement, a piezoelectric transducer constituted by stacking a plurality of unit elements is divided into a plurality of blocks having different numbers of lamination layers for driving. A change in impedance by the division is compensated by a compensation circuit, or a plurality of driving circuits corresponding to the impedance are provided and a block and a driving circuit of the piezoelectric transducer are selected in accordance with the driving velocity and moving distance for driving.

31 Claims, 14 Drawing Sheets

HIGH SPEED DRIVE ( ⎍ 20kHz,30V)

| SW1 | SW2 | SW3 | DRIVING VELOCITY |
|-----|-----|-----|------------------|
| ON | ON | ON | 30mm/sec |
| ON | ON | OFF | 10mm/sec |
| ON | OFF | OFF | 3mm/sec |

FINE DRIVE (0-150V)

| SW1 | SW2 | SW3 | MOVING DISTANCE | ACCURACY |
|-----|-----|-----|-----------------|----------|
| ON | ON | ON | 0~10μm | 100nm |
| ON | ON | OFF | 0~3μm | 30nm |
| ON | OFF | OFF | 0~1μm | 10nm |

Fig. 11(a)

HIGH SPEED DRIVE ( ⎍ 20kHz, 30V)

| SW1 | SW2 | SW3 | SW4 | DRIVING VELOCITY |
|-----|-----|-----|-----|------------------|
| ON  | ON  | ON  | ON  | 0 mm/sec         |
| ON  | ON  | ON  | OFF | 30 mm/sec        |
| ON  | ON  | OFF | OFF | 10 mm/sec        |
| ON  | OFF | OFF | OFF | 3 mm/sec         |

Fig. 11(b)

FINE DRIVE (0-150V)

| SW1 | SW2 | SW3 | SW4 | MOVING DISTANCE | ACCURACY |
|-----|-----|-----|-----|-----------------|----------|
| ON  | ON  | ON  | ON  | 0~30 μm         | 300 nm   |
| ON  | ON  | ON  | OFF | 0~10 μm         | 100 nm   |
| ON  | ON  | OFF | OFF | 0~3 μm          | 30 nm    |
| ON  | OFF | OFF | OFF | 0~1 μm          | 10 nm    |

DRIVE DEVICE USING ELECTROMECHANICAL TRANSDUCER AND AN APPARATUS EMPLOYING THE DRIVE DEVICE

BACKGROUND OF THE INVENTION

The present invention relates to a drive device using an electromechanical transducer, and to an apparatus employing a drive device using the electromechanical transducer such as a XY moving stage for precision measurement, a photo-taking lens for cameras, a projection lens for overhead projectors and a binoculars lens and the like.

When drive pulses each consisting of a gradual rising portion and a steep falling portion following it are applied on a piezoelectric transducer, the piezoelectric transducer is displaced to gradually expand in the thickness direction at the gradual rising portion of each of the drive pulses, and is displaced to rapidly contract at the steep falling portion. Thus, there has been known a drive device (as an example, refer to Japanese Patent Laid-Open Application No. 6-123830) which taking advantage of this characteristic property, applies such wavy drive pulses as described above on the piezoelectric transducer to repeat charging and discharging at different velocities, causes in the piezoelectric transducer vibrations having different velocities in the thickness direction to reciprocate a driving member fixed to the piezoelectric transducer at different velocities, and moves a moving member frictionally coupled with the driving member in a predetermined direction.

FIG. 18 is a sectional view showing an example of the constitution of a photo-taking lens driving device for cameras using the above-described drive device. In the figure, numeral 101 designates a lens barrel, to the left end of which a holding frame 102 of a first lens L1 is fixedly mounted, and the right end 101a of which forms a holding frame of a third lens L3. Inside the lens barrel 101, a holding frame 103 of a second lens L2 is movably disposed in a direction of the optical axis. Numeral 104 designates a drive shaft for driving the lens holding frame 103 in the direction of the optical axis, and the drive shaft 104 is movably supported by a first flange portion 101b of the lens barrel 101 and a flange portion 102b of the lens holding frame 102 in the direction of the optical axis, and one end thereof is fixedly adhered to one of surfaces of the piezoelectric transducer 105.

The piezoelectric transducer 105 is disposed in the thickness direction to dispose the drive shaft 104 in the axial direction, and one end surface of the piezoelectric transducer is fixedly adhered to the drive shaft 104, and the other end surface thereof is fixedly adhered to the second flange portion 101c of the lens barrel 101.

The lens holding frame 103 for holding the second lens L2 has a slider block 103b which is a moving member extending upwardly. The drive shaft 104 penetrates the slider block 103b in the horizontal direction. An opening portion 103c is formed above a portion of the slider block 103b where the drive shaft 104 penetrates whereby an upper half portion of the drive shaft 104 is exposed. A pad 106 which is brought into contact with an upper half portion of the drive shaft 104 is inserted into this opening portion 103c, a projection 106a is provided on the upper portion of the pad 106, the projection 106a of the pad 106 is pressed down by a flat spring 107, and a downward urging force F is applied on the pad 106 at a portion thereof that is brought into contact with the drive shaft 104. FIG. 19 is a sectional view showing a constitution of a frictionally-coupled portion between the drive shaft 104, and the slider block 103b and the pad 106.

Next, the description will be made of the control operation. When it is necessary to move the lens L2 in a direction indicated by an arrow a, such drive pulses each consisting of a gradual rising portion and a steep falling portion following it as shown in FIG. 20 are supplied to the piezoelectric transducer 105.

At the gradual rising portion of each of the drive pulses, the piezoelectric transducer 105 is disposed to gradually expand in the thickness direction, and the drive shaft 104 is displaced in a direction indicated by the arrow a in the axial direction. This causes the drive shaft 104 to be brought into press contact by a flat spring 107 to move the slider block 103b and the pad 106 which have been frictionally coupled in the direction indicated by an arrow a, and therefore, the lens holding frame 103 can be moved in the direction indicated by the arrow a.

At the steep falling portion of each of the drive pulses, the piezoelectric transducer 105 is rapidly disposed to contract in the thickness direction, and the drive shaft 104 is also displaced in a direction opposed to the direction indicated by the arrow a in the axial direction. At this time, the slider block 103b, the pad 106 and the lens holding frame 103 which have been brought into press contact with the drive shaft 104 by the flat spring 107 substantially stay at their positions by surpassing the frictional force between the slider block 103b, the pad 106 and the lens holding frame 103, and the drive shaft 104 by the inertia thereof, and the lens holding frame 103 is not moved.

Incidentally, according to the expression "substantially" mentioned here, there is included a movement of the slider block 103b where the slider block 103b follows the drive shaft 104 while slipping at frictionally coupled faces between the slider block 103b, the pad 106 and the drive shaft 104 in any of a direction indicated by an arrow a and the direction opposed thereto and the slider block 103b is moved in the direction indicated by an arrow a as a whole by a difference in drive time periods.

By continuously applying the above-described drive pulses on the piezoelectric transducer 105, it is possible to continuously move the lens holding frame 103 in a direction indicated by the arrow a.

A movement of the lens holding frame 103 in a direction opposed to the direction indicated by the arrow a can be achieved by applying wavy drive pulses each consisting of a steep rising portion and a gradual falling portion following it on the piezoelectric transducer 105.

In the above-described drive device using the piezoelectric transducer, there has been adopted a method of driving by applying saw tooth wave pulses generated by a drive pulse generating circuit on the piezoelectric transducer, or combining a constant-current charging circuit with a short-circuit discharging circuit to apply drive pulses each consisting of constant-current charging and rapid discharging, or applying drive pulses each consisting of rapid charging and constant-current discharging on the piezoelectric transducer.

On the other hand, in the drive device of this sort, precise positioning is generally achieved by making the driving velocity slow. In the drive device using the piezoelectric transducer, the driving velocity can be made slower by lowering the voltage of the drive pulses to reduce the expansion and contraction displacements thereof, but there is a drawback where the thrust force (driving force) also becomes smaller at the same time, and the driving velocity and the thrust force become unstable.

Particularly in the case of a fine moving distance, a voltage to be applied also becomes very low, the thrust force (driving force) also become small, and the moving distance and thrust force become unstable, resulting in a drawback where it becomes difficult to position precisely.

FIG. 1 is a diagram showing relationship between voltage of drive pulses to be applied on the piezoelectric transducer and driving velocity, showing that as the voltage of drive pulses increases, the driving velocity also becomes faster, and that as the voltage of the drive pulses lowers, the driving velocity also lowers, but that when the voltage of drive pulses lowers below a predetermined critical value p, the driving velocity becomes unstable.

FIG. 2 is a diagram showing relationship between voltage of drive pulses to be applied on the piezoelectric transducer and thrust force, showing that as the voltage of drive pulses increases, the thrust force also increases, and that as the voltage of the drive pulses lowers, the thrust force also decreases, but that when the voltage of drive pulses lowers below a predetermined critical value q, the thrust force becomes unstable.

Further, FIG. 3 is a diagram showing relationship between a frequency of drive pulses to be applied on the piezoelectric transducer and the driving velocity, showing that as the frequency of drive pulses increases, the driving velocity also becomes faster, and that as the frequency of the drive pulses lowers, the driving velocity also decreases.

In this case, the driving velocity does not become unstable at low frequencies, but there is a drawback where vibration sound generated is heard as noises to the human ear at an audio frequency or less (about 20 kHz or less).

FIG. 4 is a view showing a waveform of drive pulses when the drive pulses are thinned out every a specified period of time without changing the voltage and frequency of drive pulses to be applied on the piezoelectric transducer, and is advantageous in that the voltage and frequency are maintained, but the driving becomes intermittent because the drive pulses are thinned out. For this reason, there is a drawback where vibration sound corresponding to a period of the intermittent driving is generated and is heard as noises to the human ear.

As a countermeasure against this, it is considered to reduce a number of lamination layers of an unit element constituting the piezoelectric transducer without changing the voltage and frequency of drive pulses applied on the piezoelectric transducer in order to make the driving velocity slower. That is, if the unit element constituting the piezoelectric transducer is divided into a plurality of blocks and drive pulses of a sufficient amplitude are applied to only some of those blocks, the thrust force (driving force) remains unchanged and the driving velocity does not become unstable because the expansion and contraction displacements of the unit element do not change.

In order to conduct precise positioning in a drive device of this sort, there is a method for moving to a target position by switching to low-velocity driving which causes desired expansion displacement by applying DC voltage on the piezoelectric transducer after high-velocity driving which applies drive pulses on the piezoelectric transducer to cause reciprocal displacements and moves a driven member to near a desired position.

In such low-velocity driving, since a movable distance is in proportion to a number of lamination layers of an unit element constituting the piezoelectric transducer, it will suffice if the number of lamination layers of the unit element is increased to increase the moving distance by low-velocity driving. When, however, the number of lamination layers of the unit element is increased, the resonance frequency of a driving system including the piezoelectric transducer lowers. For this reason, when low-velocity driving is conducted using the piezoelectric transducer having a large number of lamination layers of the unit element, there are no particular problems, but when this piezoelectric transducer (piezoelectric transducer having a large number of lamination layers of the unit element) is commonly used also for high-velocity driving, there is a drawback where vibrations of audio frequency or less (20 kHz or less) are generated and the vibration sound is heard as noises to the human ear.

In case where the piezoelectric transducer is divided into a plurality of blocks, when design is made such that numbers of unit elements of piezoelectric transducers constituting the respective blocks are different in order to obtain a desired driving velocity, the impedance differs with the block. In other words, since the impedance of the piezoelectric transducer, which is a load as viewed from the drive pulse circuit side, changes in accordance with a block selected to obtain a desired driving velocity, there arises a case where drive pulses each having the desired waveform cannot be applied on the piezoelectric transducer. Namely, there arises a drawback where the desired driving velocity cannot be obtained simply depending upon a change in the number of lamination layers of the piezoelectric transducer.

Further, in a drive device of this sort, as described above, the driving velocity is generally made slower by lowering the voltage of drive pulses for precision positioning, but when the voltage of drive pulses lowers below the critical value, no displacement is caused.

More specifically, FIG. 5 is a view showing relationship between drive pulse voltage applied on the piezoelectric transducer and displacement; FIG. 5($a$) shows a pulse voltage applied in a predetermined time, and FIG. 5($b$) shows displacement generated in a predetermined time. As shown in FIGS. 5($a$) and ($b$), when the drive pulse voltage exceeds the critical value as shown by a line Va, such displacement as indicated by a line Da adapted to the drive pulse voltage is caused, but when the drive pulse voltage is the critical value or less as shown by a line Vb, no displacement adapted to the drive pulse voltage is caused as shown by a line Db.

SUMMARY OF THE INVENTION

It is a principal object according to the present invention to provide a drive device and an apparatus employing the drive device using an electromechanical transducer capable of driving at a stable driving velocity by a stable driving force both at high velocity and at low velocity, and precision positioning by precisely adjusting a movement.

It is another object according to the present invention to provide a drive device and an apparatus employing the drive device using an electromechanical transducer capable of preventing vibrations of an audio frequency due to the lowered resonance frequency of a driving system from occurring.

It is a further object according to the present invention to provide a drive device and an apparatus employing the drive device using an electromechanical transducer capable of compensating a change in impedance when the electromechanical transducer is divided into a plurality of blocks to provide a stable driving force, a stable driving velocity and precise movement, and effectively driving the electromechanical transducer.

It is an even further object according to the present invention to provide a drive device and an apparatus employing the drive device using an electromechanical transducer capable of effectively driving the electromechanical transducer by providing a driving circuit corresponding to a change in impedance when the electromechanical transducer is divided into a plurality of blocks.

Other objects according to the present invention will become apparent from the detailed description with reference to the accompanying drawings.

BRIEF DESCRIPTION OF THE DRAWINGS

FIGS. 11(a) and 11(b) are diagrams showing one example each of driving velocity due to a high speed circuit in a modified example in which the piezoelectric transducer is divided into four blocks and a moving distance due to a fine drive circuit.

DETAILED DESCRIPTION OF PREFERRED EMBODIMENTS

Figure 6:
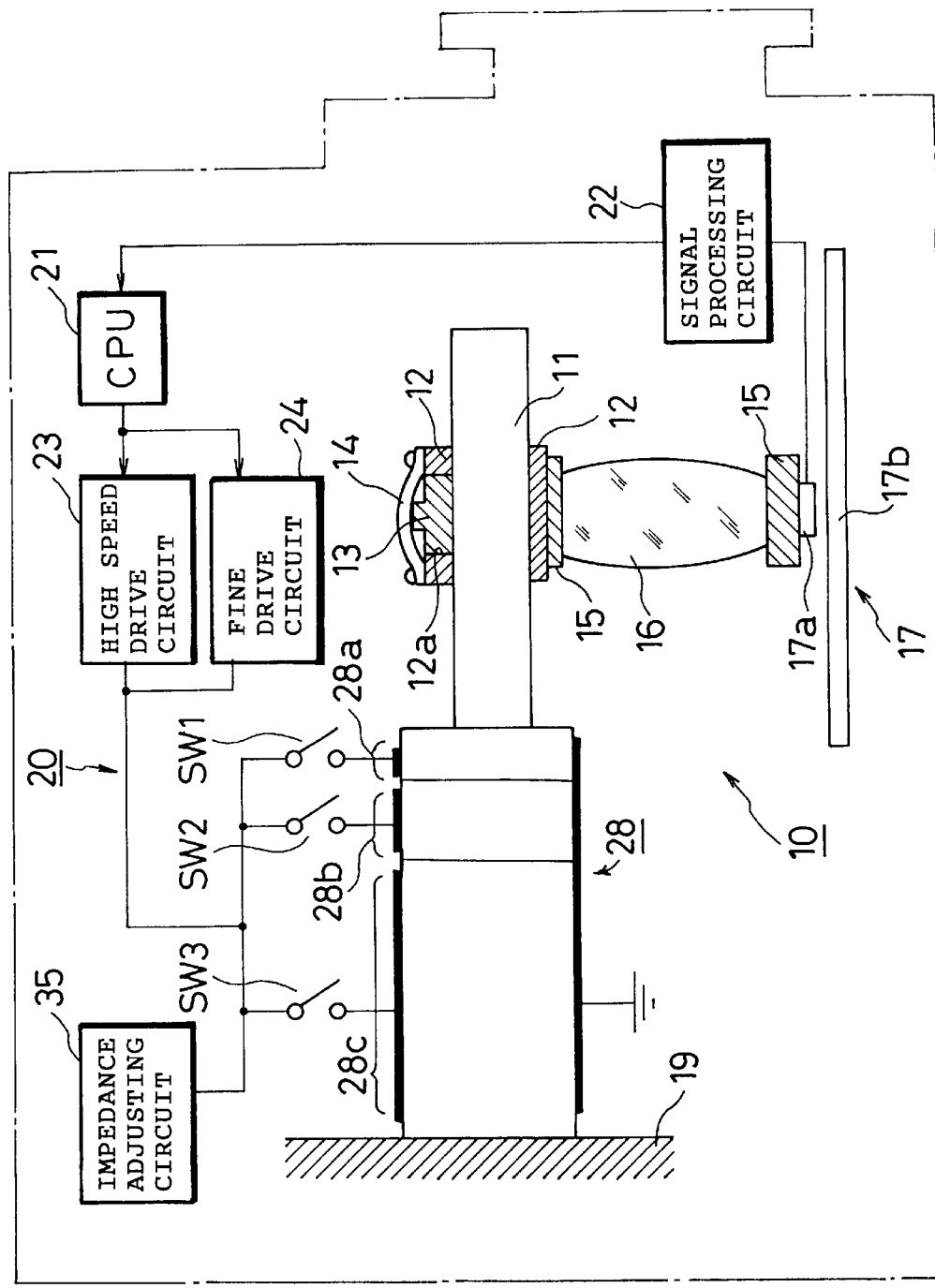
FIG. 6 is one embodiment of the present invention, and which shows a block diagram showing a driving mechanism and a control circuit of a drive device using a piezoelectric transducer.

Hereinafter, the description will be made of embodiments according to the present invention. FIG. 6 is a block diagram showing a driving mechanism 10 and a control circuit 20 when a drive device using a piezoelectric transducer is applied to a lens barrel such as a taking lens of a camera.

A constitution of the driving mechanism 10 for the lens device will be briefly described. Numeral 28 designates a piezoelectric transducer, one end of which is fixedly adhered to a frame 19, and to the other end of which a drive shaft 11 supported by supporting means (not shown) so as to be freely disposed in the axial direction is fixedly adhered.

Figures 7, 8A, 8B:
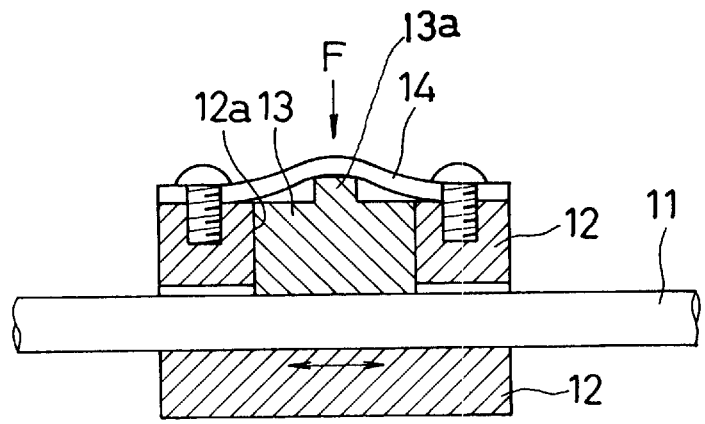
FIG. 7 is a sectional view showing a frictionally-coupled portion between a drive shaft, and a slider block and a pad.
FIGS. 8(a) and 8(b) are diagrams showing one example each of driving velocity due to a high speed drive circuit and a moving distance due to a fine drive circuit.

Numeral 12 designates a slider block, and the drive shaft 11 penetrates the slider block in the horizontal direction. An opening portion 12a is formed above a portion of the slider block 12 where the drive shaft 11 penetrates whereby an upper half portion of the drive shaft 11 is exposed. A pad 13 which is brought into contact with the upper half portion of the drive shaft 11 is inserted into this opening portion 12a, a projection 13a is provided on the upper portion of the pad 13, the projection 13a of the pad 13 is pressed down by a flat spring 14, and a downward urging force F is applied on the pad 13 at a portion which is brought into contact with the drive shaft 11. FIG. 7 is a sectional view showing a constitution of a frictionally-coupled portion between the drive shaft 11, and the slider block 12 and the pad 13.

By the above-described constitution, the slider block 12 including the pad 13, and the drive shaft 11 are brought into press contact with each other by the urging force F of the flat spring 14 and are frictionally coupled.

Below the slider block 12, a lens holding frame 15 is fixed so as to hold a lens 16. Numeral 17a designates a magnetic resistance detection element for detecting a position of the lens 16 which is fixed to the lens holding frame 15. In the magnetic resistance detection element 17a, there is disposed a magnetizing rod 17b near thereto in which magnetic poles of NS are magnetized at a predetermined interval$\lambda$, and a known MR sensor (magnetic resistance sensor) 17 is constituted by the magnetic resistance detection element 17a and the magnetizing rod 17b. When the lens holding frame 15 moves, it is possible to know the current position of the lens through a signal outputted when the magnetic resistance detection element 17a of the MR sensor detects a change in the magnetic poles of the magnetizing rod 17b.

A control circuit 20 is composed of CPU 21, a MR sensor output signal processing circuit 22 connected to an input port thereof, a high speed drive circuit 23 and a fine drive circuit 24 connected to the output port thereof, and an impedance adjusting circuit 35 connected to the piezoelectric transducer 28 in parallel. The impedance adjusting circuit 35 will be described in detail later.

The piezoelectric transducer 28 is constituted by stacking a plurality of blocks each of which is constituted by stacking one or a plurality of unit piezoelectric elements. In this embodiment, a first block 28a consists of a number of unit elements 1 (zero power of 2), a second block 28b, a number of unit elements 2 (first power of 2), and a third block 28c, a number of unit elements 4 (second power of 2). The first block 28a is connected to the high speed drive circuit 23 and the fine drive circuit 24 through a switching element SW1, the second block 28b is connected to the high speed drive circuit 23 and the fine drive circuit 24 through SW2, and the third block 28c is connected to the high speed drive circuit 23 and the fine drive circuit 24 through SW3.

In this respect, the above-described switching elements SW1 to SW3 are constituted by a semiconductor switching element controlled by CPU 21 in the control circuit 20.

Next, the description will be made of the operation of the control circuit 20. First, high-velocity driving by the high speed drive circuit 23 will be described. In the case of the high-velocity driving, drive pulses of a predetermined frequency are applied on the piezoelectric transducer for driving. In this case, if the frequency of drive pulses is sufficiently lower than a resonance frequency of the driving mechanism including the piezoelectric transducer (in the experiment, a case where the frequency of drive pulses is not higher than ½ of the resonance frequency of the driving mechanism), the speed of a movable body (lens in this case) becomes a product of the expansion of the piezoelectric transducer and the frequency of the drive pulses.

If the same voltage is applied on the piezoelectric transducers, the greater the number of lamination layers of piezoelectric transducer is, the larger becomes the expansion, and therefore, the greater the number of lamination layers is, the faster becomes the driving velocity. When, however, the number of lamination layers increases, the resonance frequency of the driving mechanism including the piezoelectric transducer lowers, and therefore vibration sound occurring during driving is within an audio frequency range, and do not only give an unpleasant feeling to the human ear, but also the driving velocity lowers due to the lowered resonance frequency. Thus, there are some cases where driving cannot be made in the ultrasonic wave area. In this respect, the number of lamination layers of the element is limited.

In the high-velocity driving, the switching elements SW1 to SW2 are so appropriately selectively operated as to have a number of lamination layers of piezoelectric element suitable for a desired driving velocity, and the first block 28a to the third block 28c are connected to the high speed drive circuit 23 whereby the desired driving velocity can be set. In this case, when the resonance frequency of the driving mechanism including the piezoelectric transducer is high, a stable velocity can be obtained. Therefore, switching element can be selected in such a manner that a block near the drive shaft 11 is driven in preference.

Next, the description will be made of low-velocity driving using the fine drive circuit 24. The low-velocity driving is to move only a fine distance by applying DC voltage to a piezoelectric transducer to cause expansion displacement in the piezoelectric transducer. Since the expansion of the piezoelectric transducer is determined by the DC voltage applied, if relationship between the DC voltage applied and the expansion of the unit piezoelectric transducer is determined by measurement, etc. in advance, the moving distance can be represented by a product of the expansion of the unit piezoelectric transducer and the number of lamination layers when the DC voltage applied is constant, and the moving distance can be accurately determined in advance.

The larger the number of lamination layers of the piezoelectric transducer to be driven is, the longer becomes the moving distance, but when the number of lamination layers increases, the precision of the moving distance lowers owing to dispersion in the expansion of individual unit piezoelectric transducers stacked. In addition, in order to obtain a stable thrust force on setting the moving distance, the DC voltage to be applied on the piezoelectric transducer is not changed, but the number of piezoelectric transducers to be applied is increased or decreased to set the desired moving distance as a whole.

For this reason, in the low-velocity driving, the desired moving distance can be set by so selectively operating the switching elements SW1 to SW3 as to have a number of lamination layers of piezoelectric element suitable for the desired moving distance, and connecting the first block 28a to the third block 28c to the fine drive circuit 24. Since for a block for use, a block near to drive shaft 11 is advantageous to obtain a stable thrust force, a block near to the drive shaft 11 can be selected in accordance to the desired moving distance by the switching element so as to be used in preference to others.

FIG. 8 is a view showing an example of driving velocity due to the high speed drive circuit and moving distance due to the fine drive circuit. FIG. 8(a) exemplifies velocities obtained by the selection of the switching elements SW1 to SW3 when drive pulses of 20 kHz at 30 V are supplied from the high speed drive circuit 23, showing that a velocity of 30 mm/sec is obtained when the switching elements SW1 to SW3 are turned ON, that a velocity of 10 mm/sec is obtained when the switching elements SW1 and SW2 are turned ON but SW3 is turned OFF, and that a velocity of 3 mm/sec is obtained when the switching element SW1 is turned ON but SW2 and SW3 are turned OFF.

FIG. 8(b) exemplifies moving distances and the accuracy precision obtained by the selection of the switching elements SW1 to SW3 when DC voltage of 0 to 150 V is supplied from the fine drive circuit 24, showing that a moving range of 0 to 10 $\mu$m and precision of 100 nm are obtained when the switching elements SW1 to SW3 are turned ON, that a moving range of 0 to 3 $\mu$m and precision of 30 nm are obtained when the switching elements SW1 and SW2 are turned ON but SW3 is turned OFF, and that a moving distance of 0 to 1 $\mu$m and precision of 10 nm are obtained when the switching element SW1 is turned ON but SW2 and SW3 are turned OFF.

Figure 9:
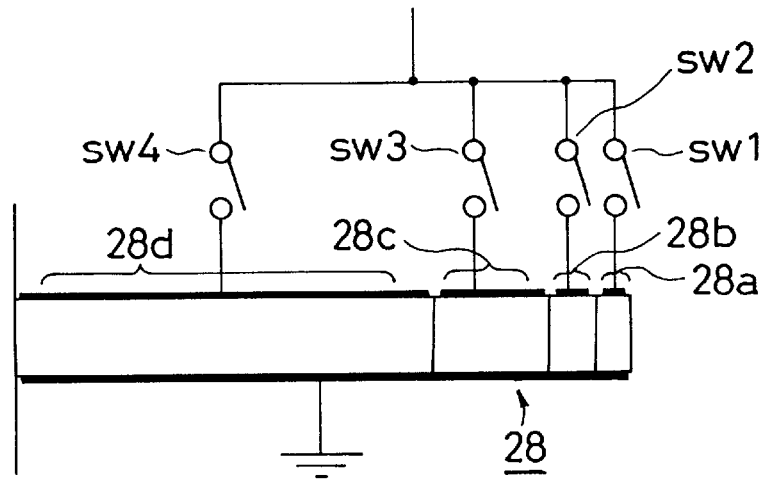
FIG. 9 is an explanatory view showing a modified example in which the piezoelectric transducer is divided into four blocks.

FIG. 9 shows a modified example in which the number of elements of a piezoelectric transducer in the first embodiment is increased and is divided into four blocks. The block division number of the piezoelectric transducer is thus increased into a first block 28a, a second block 28b, a third block 28c and a fourth block 28d, and it is possible to set the driving velocity for high-velocity driving and moving distance for low-velocity driving more finely by appropriately selecting these blocks by the switching elements SW1 to SW4.

Figure 10:
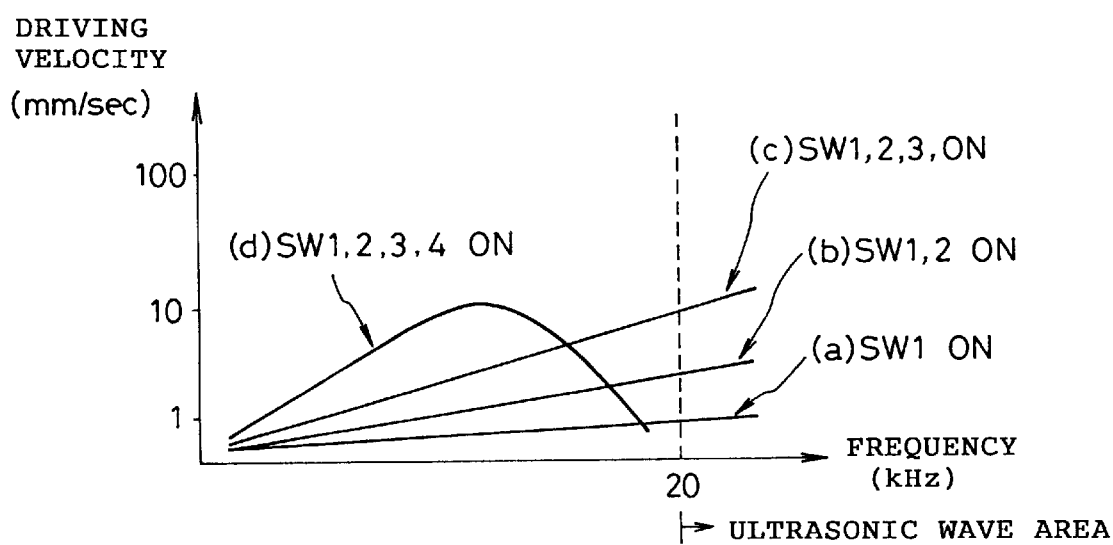
FIG. 10 is a diagram for relationship between selection of a block in a modified example in which the piezoelectric transducer is divided into four blocks and driving speed in the case of high-velocity driving.

FIG. 10 is a view showing relationship between selection of blocks and driving velocity for high-velocity driving when the above-described piezoelectric transducer is divided into four blocks. A line (a) shows a case where the first block 28a (number of unit elements is zero power of 2=1) is selected, a line (b) shows a case where the first block 28a and the second block 28b (number of unit elements is first power of 2=2) are selected, and a line (c) shows a case where the first block 28a, the second block 28b and the third block 28c (number of unit elements is second power of 2=4) are selected, showing that as the frequency of drive pulses applied on the piezoelectric transducer becomes higher, the driving velocity increases.

A line (d) shows a case where all blocks from the first block 28a to the fourth block 28d (number of unit elements is third power of 2=8) of the piezoelectric transducer are selected, showing in this case that the moving velocity of the movable body becomes zero at frequencies in an ultrasonic wave area of 20 kHz or more because the resonance frequency of the driving mechanism including the piezoelectric transducer lowers. Under such conditions, the fourth block 28d of the piezoelectric transducer should not be selectively driven in the case of high-velocity driving. If the fourth block 28d is not selectively driven, driving can be made even in the ultrasonic wave area.

FIG. 11 is a view showing an example of driving velocity due to the high speed drive circuit and moving distance due to the fine drive circuit in the example shown in FIG. 9 in which the piezoelectric transducer is divided into four blocks. FIG. 11(a) exemplifies velocities obtained by the selection of the switching elements SW1 to SW4 when drive pulses of 20 kHz at 30 V are supplied from the high speed drive circuit 23, showing that a velocity of 0 mm/sec is obtained when the switching elements SW1 to SW4 are turned ON, that a velocity of 30 mm/sec is obtained when the switching elements SW1 to SW3 are turned ON but SW4 is turned OFF, that a velocity of 10 mm/sec is obtained when the switching elements SW1 and SW2 are turned ON but SW3 and SW4 are turned OFF and that a velocity of 3 mm/sec is obtained when the switching element SW1 is turned ON but SW2 to SW4 are turned OFF.

FIG. 11(b) exemplifies moving distances and the accuracy obtained by the selection of the switching elements SW1 to SW4 when DC voltage of 0 to 150 V is supplied from the fine drive circuit 24, showing that a moving range of 0 to 30 μm and precision of 300 nm are obtained when the switching elements SW1 to SW4 are turned ON, that a moving range of 0 to 10 μm and precision of 100 nm are obtained when the switching elements SW1 to SW3 are turned ON but SW4 is turned OFF, that a moving distance of 0 to 3 μm and precision of 30 nm are obtained when the switching elements SW1 and SW2 are turned ON but SW3 and SW4 are turned OFF, and that a moving distance of 0 to 1 μm and precision of 10 nm are obtained when the switching element SW1 is turned ON but SW2 to SW4 are turned OFF.

Accordingly, in the high-velocity driving, it is possible to turn off the switching element SW4 and to set the desired driving velocity by the switching elements SW1 to SW3, and in the low-velocity driving, to appropriately set in accordance with the desired moving distance by the switching elements SW1 to SW4. In this case, it is possible to set a longer moving distance than in the example shown in FIG. 7 by selecting the fourth block 28d by the switching element SW4.

Figure 12:
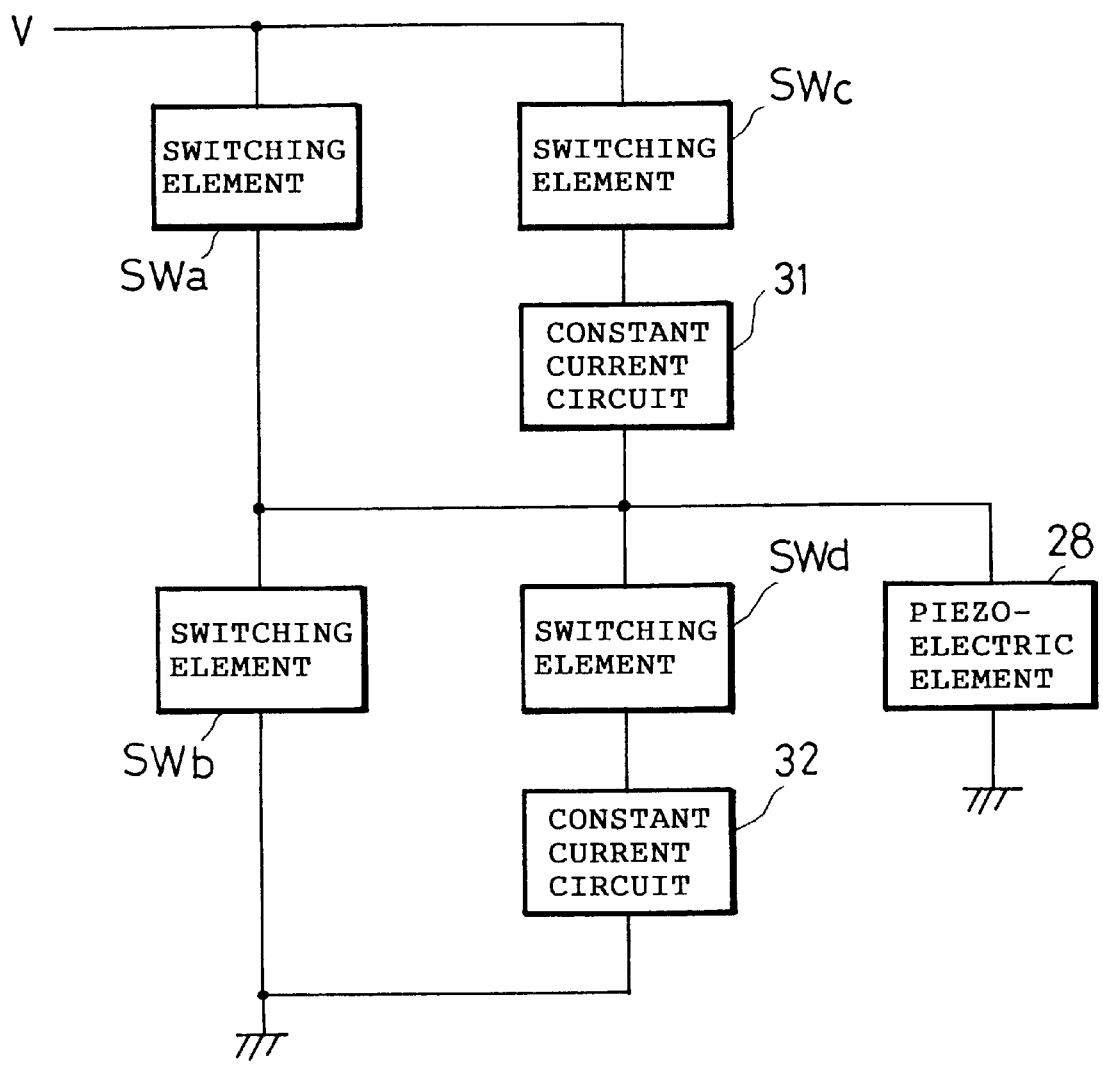
FIG. 12 is a block diagram showing an example of a high speed drive circuit and a fine drive circuit in the control circuit.

FIG. 12 shows an example of the high speed drive circuit 23 and the fine drive circuit 24 in the control circuit shown in FIG. 6. Since the high speed drive circuit 23 and the fine drive circuit 24 have the same circuit constitution, only the high speed drive circuit will be described. The high speed drive circuit 23 is composed of known constant-current circuits 31 and 32 and semiconductor switching elements SWa, SWb, SWc and SWd which are controlled by the control circuit, CPU 21 (See FIG. 6).

For the high-velocity driving, drive pulses for gradually charging and rapidly discharging or drive pulses for rapidly charging and gradually discharging are supplied to the piezoelectric transducer. In other words, when drive pulses for gradually charging and rapidly discharging are supplied to the piezoelectric transducer 28, SWa and SWd are maintained to be in an OFF state through a signal outputted from CPU 21. When SWc is turned ON in this state, a constant current from a power supply V flows in the piezoelectric transducer 28 through SWc and a constant-current circuit 31 for gradually charging. Next, when SWb is turned ON, charge obtained by charging the piezoelectric transducer 28 is rapidly discharged through SW1. By ON/OFF controlling SWc and SWb alternately at a predetermined period, drive pulses with a predetermined period can be supplied to the piezoelectric transducer.

When supplying drive pulses for rapidly charging and gradually discharging to the piezoelectric transducer 28, SWc and SWb are maintained to be in an OFF state through a signal outputted from CPU 21. When SWa is turned ON in this state, a current from a power supply V flows in the piezoelectric transducer 28 through SWa for rapidly being charged. Next, when SWd is turned ON, charge obtained by charging the piezoelectric transducer 28 flows in constant current through SWd and the constant-current circuit 32 for gradually discharging. By ON/OFF controlling SWa and SWd alternately at a predetermined period, drive pulses with a predetermined period can be supplied to the piezoelectric transducer.

For the low-velocity driving, direct current is supplied to the piezoelectric transducer so as to gradually charge (or gradually discharge) it. In other words, in order to cause a predetermined expansion corresponding to the moving distance, the switching element SWc for the fine drive circuit 24 (the same circuit constitution as the high speed drive circuit 23) is turned ON, and the piezoelectric transducer 28 is gradually charged with direct current supplied from the power supply V to cause a predetermined expansion. In this case, the switching element SWb is turned ON to discharge the charge charged. Also, in order to cause a predetermined contraction corresponding to the moving distance, the switching element SWd is turned ON to gradually discharge after the switching element SWa is turned ON to rapidly charge once, thus causing a predetermined contraction.

A drive circuit for driving the piezoelectric transducer is generally constituted so as to cause no loss by matching the impedance thereof to the impedance of the piezoelectric transducer which is a load of the circuit.

Figures 13A, 13B, 13C, 13D, 13E, 13F, 13G, 13H:
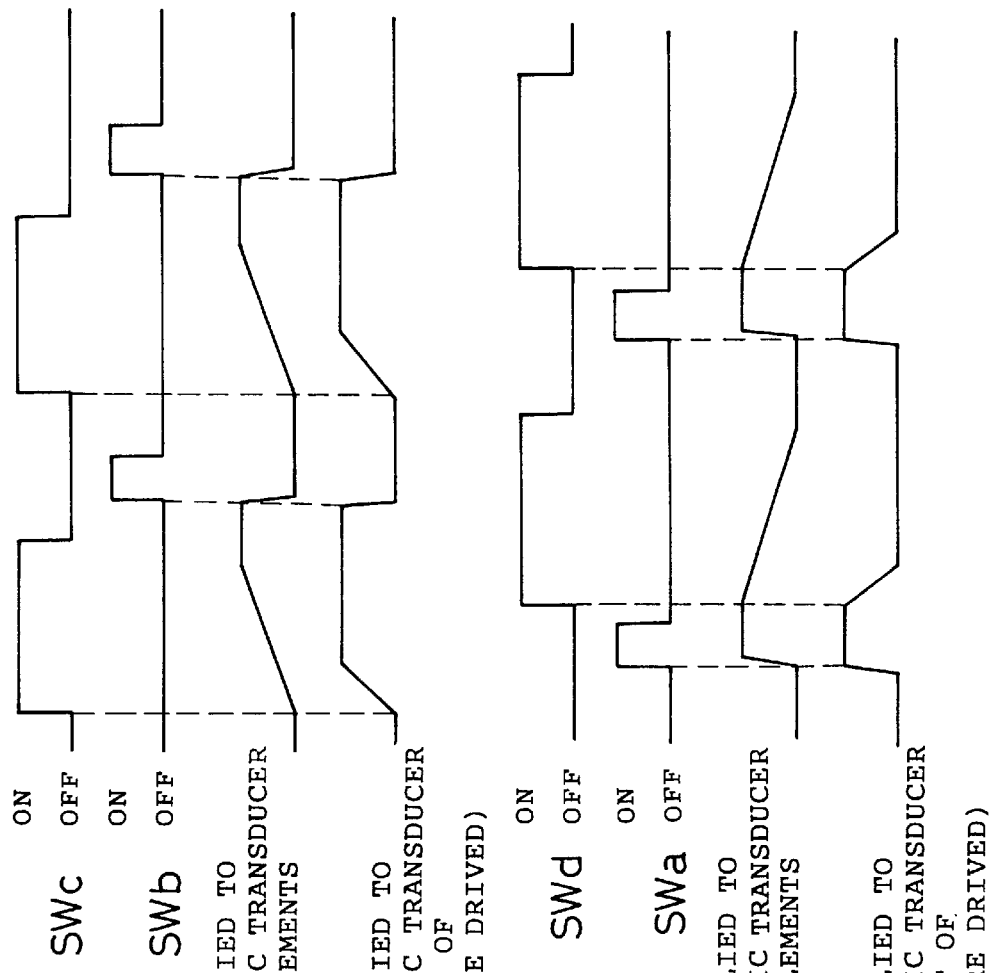
FIGS. 13(a), 13(b), 13(c), 13(d), 13(e), 13(f), 13(g) and 13(h) are explanatory views for a ON/OFF state of a switching element in the high speed circuit, and waveform and waveform collapse of drive pulses applied on the piezoelectric transducer.

As described above, however, when the number of piezoelectric elements constituting the piezoelectric transducer is changed in accordance with the driving velocity and moving distance, the impedance of the piezoelectric transducer is changed. For this reason, mismatching in impedance is caused between the piezoelectric transducer and the driving circuit (high speed drive circuit 23 or fine drive circuit 24), and a loss is caused to collapse the waveform of drive pulses. FIGS. 13(a) to 13(h) are diagrams showing the ON/OFF state of switching element for the high speed drive circuit, a waveform of drive pulses applied on the piezoelectric transducer and collapse of the waveform. FIGS. 13(a), (b), (c) and (d) show ON/OFF of SWc and SWd when SWc and SWb are ON/OFF controlled to cause drive pulses each consisting of gradual charging and rapid discharging, and a voltage waveform applied to the piezoelectric transducer. FIGS. 13(e), (f), (g), and (h) show ON/OFF of SWd and SWa when SWa and SWd are ON/OFF controlled to cause drive pulses each consisting of rapid charging and gradual discharging, and a voltage waveform applied to the piezoelectric transducer.

When the number of piezoelectric elements constituting such piezoelectric transducer is changed, in order to avoid mismatching between impedance of the piezoelectric transducer which occurs at this time and that of the driving circuit (high speed drive circuit 23 or fine drive circuit 24), it is necessary to prepare a plurality of driving circuits each having impedance adapted to the number of elements driven, and to switch the driving circuits in accordance with the number of elements to be driven. According to the present invention, impedance adjusting circuits 35 have been provided in parallel at the piezoelectric transducer so as not to change the impedance even if the number of elements constituting the piezoelectric transducer is changed for solving the problem.

Figure 14:
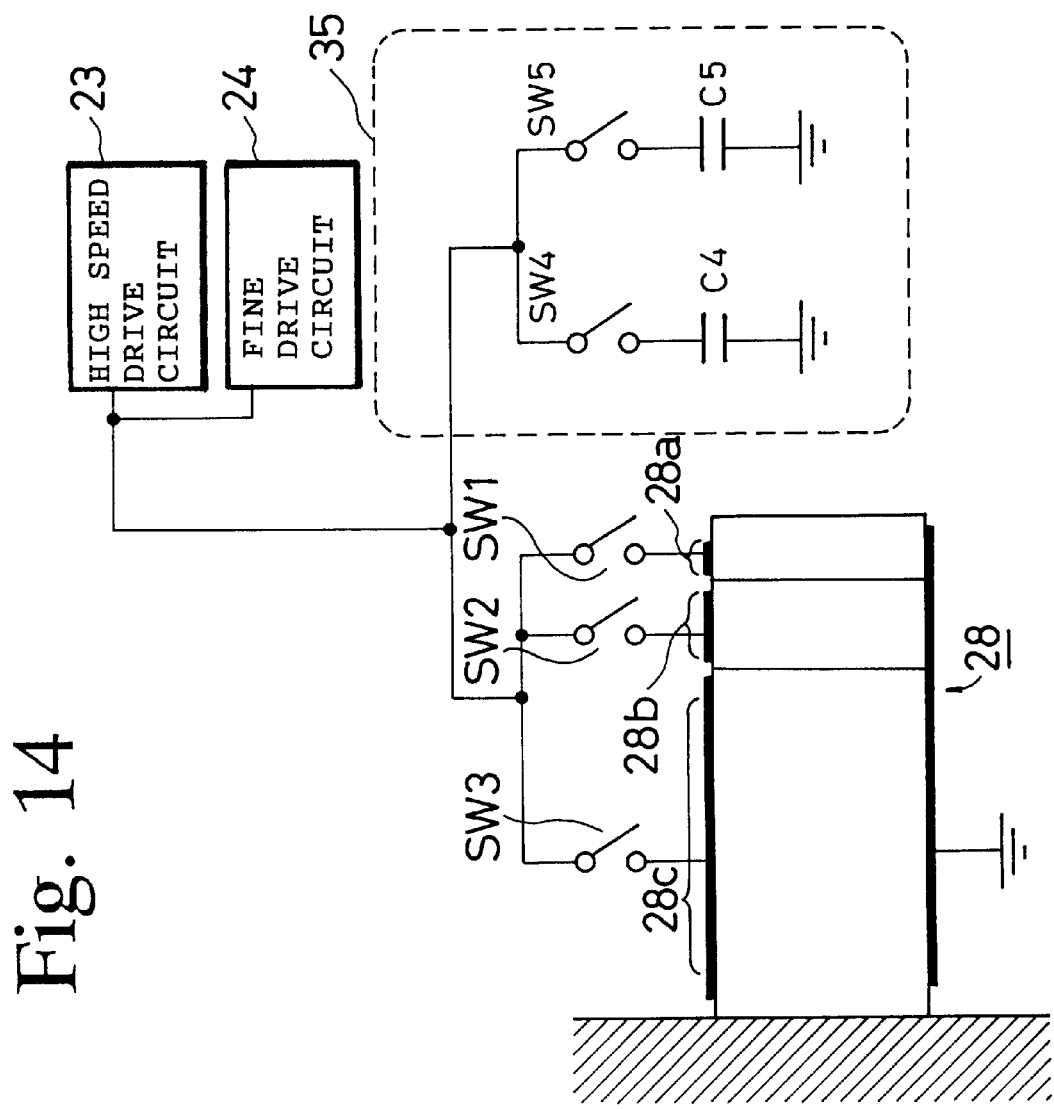
FIG. 14 is an explanatory view for block division of the piezoelectric transducer and impedance adjusting circuit.

FIG. 14 shows a piezoelectric transducer 28 and a portion of an impedance adjusting circuit 35 in the control circuit 20 shown in FIG. 6. The impedance adjusting circuit 35 is constituted in such a manner that a capacitor C5 having a capacity corresponding to the capacity component of the second block 28b of the piezoelectric transducer and a capacitor C4 having a capacity corresponding to the capacity component of the third block 28c can be connected to the driving circuit through switching elements SW5 and SW4 respectively.

This supplements the capacity component of the piezoelectric transducer separated from the driving circuit because the impedance of the piezoelectric transducer is mainly for the capacity component.

Now, when driving only the first block 28a of the piezoelectric transducer, capacitors C4 and C5 are connected to the driving circuit in parallel with switching elements SW4 and SW5 turned ON to supplement the capacity components of the second block 28b and the third block 28c separated from the driving circuit. Also, when driving the first block 28a and second block 28b of the piezoelectric transducer, the capacitor C4 is connected to the driving circuit in parallel with the switching element SW4 turned ON to supplement the capacity component of the third block 28c separated from the driving circuit.

Figure 15:
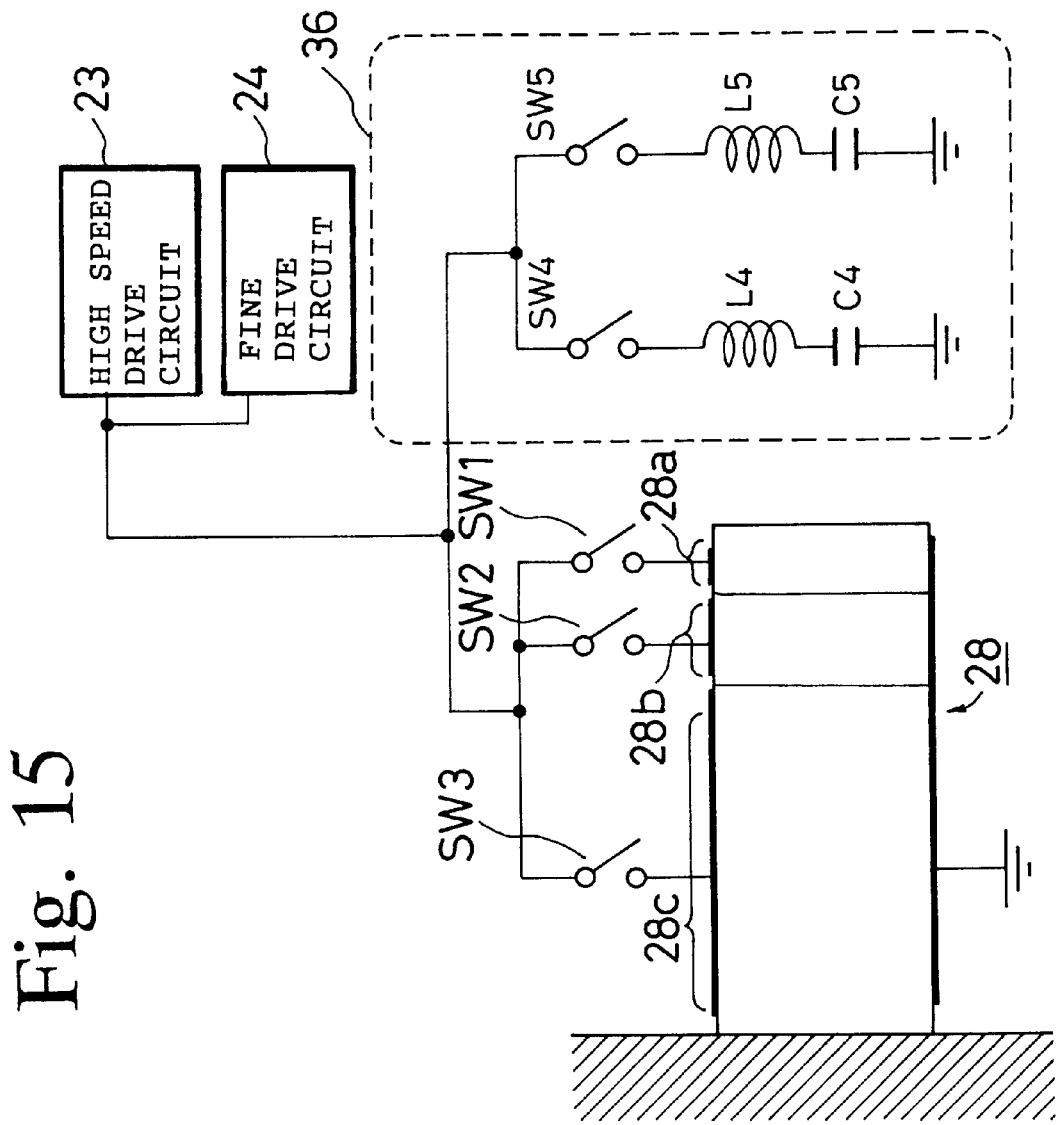
FIG. 15 is an explanatory view for another example of an impedance adjusting circuit.

FIG. 15 shows a modified example of the impedance adjusting circuit 35 which supplements the capacity component shown in FIG. 14, and shows an impedance adjusting circuit 36 which has been arranged to supplement not only the capacity component but also the inductance component. The inductance component is compensated by inserting coils L4 and L5 in the capacitors C4 and C5 in series in the impedance adjusting circuit 35 shown in FIG. 14 respectively.

The impedance adjusting circuit described above can be used also for adjusting the waveform distortion which occurs when the output of the driving circuit (high speed drive circuit 23 or fine drive circuit 24) is amplified by an amplifier.

In this respect, in each embodiment described above, there is shown an example in which the piezoelectric transducer is constituted by stacking a plurality of blocks each of which is constituted by stacking a plurality of unit piezoelectric elements, and in which those blocks are constituted by the number whereby the number of lamination layers of the unit element increases in n-th power (n is a positive integer) of 2 such as 1, 2, 4, . . . . However, the number of lamination layers of unit elements constituting the block is not limited to this, but the number of lamination layers may include a number which increases exponentially such as n-th power of 3 and n-th power of 10.

Next, the description will be made of a second embodiment according to the present invention. The second embodiment is for a piezoelectric transducer which is constituted by a plurality of blocks having different numbers of lamination layers of the unit piezoelectric element in the same manner as the first embodiment, but since the impedance differs with the block because of the number of lamination layers of the piezoelectric transducer being different, a plurality of driving circuits are provided so as to obtain the optimum driving current for each block.

Figure 16:
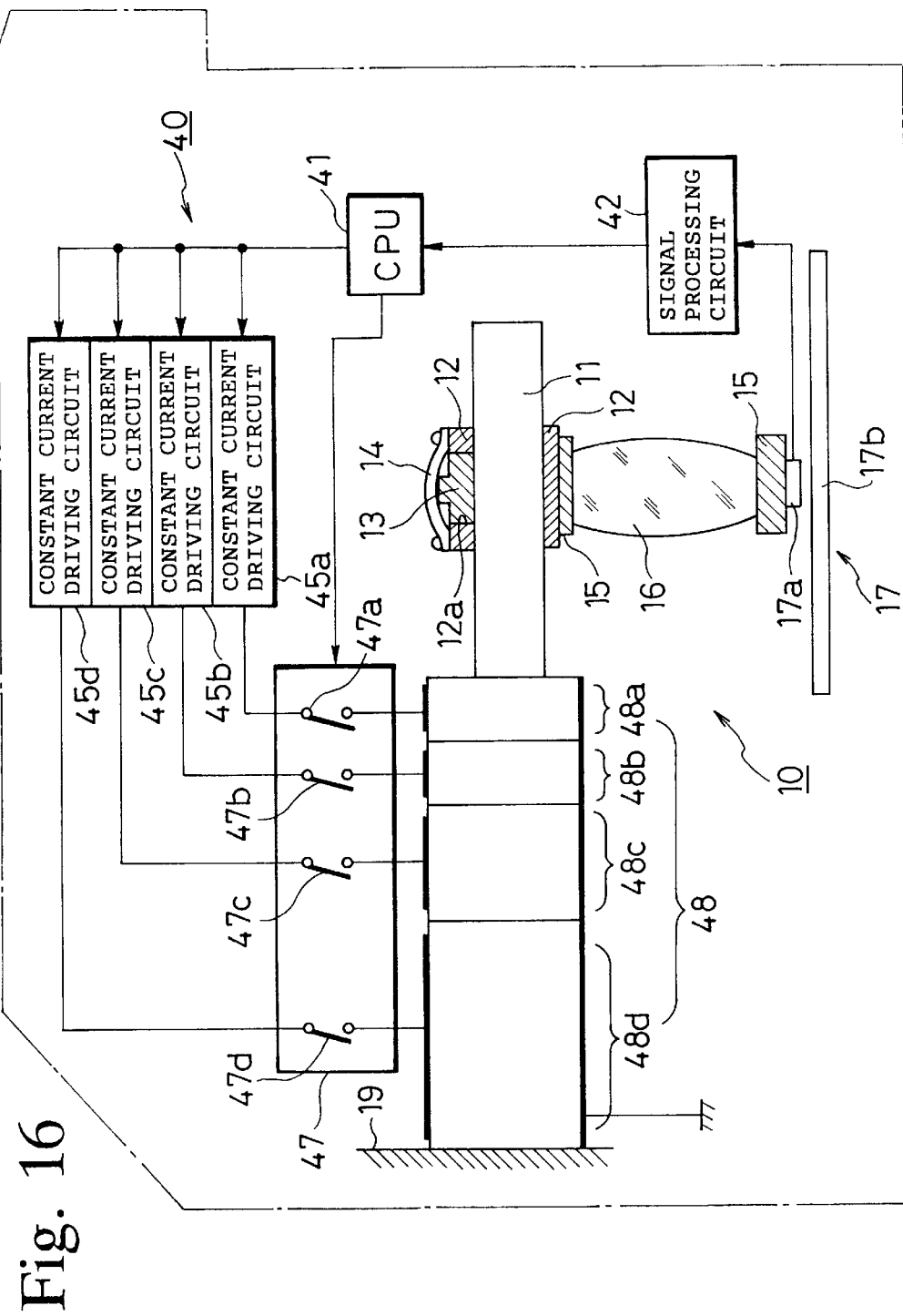
FIG. 16 is another embodiment of the present invention, and which shows a block diagram for a driving mechanism and a control circuit of a drive device using a piezoelectric transducer.

FIG. 16 is a block diagram showing a driving mechanism 10 and its drive control circuit using a piezoelectric transducer applied to a lens of a camera. The common portions to the first embodiment are designated by the same reference numerals, and the explanation thereof will be omitted. The piezoelectric transducer and drive control circuit will be described.

The drive control circuit 40 is constituted by a switching circuit 47 consisting of a CPU 41, a MR sensor output signal processing circuit 42 connected to its input port, constant-current driving circuits 45a, 45b, 45c, and 45d, connected to the output port and switching elements 47a, 47b, 47c, and 47d.

Figure 1:
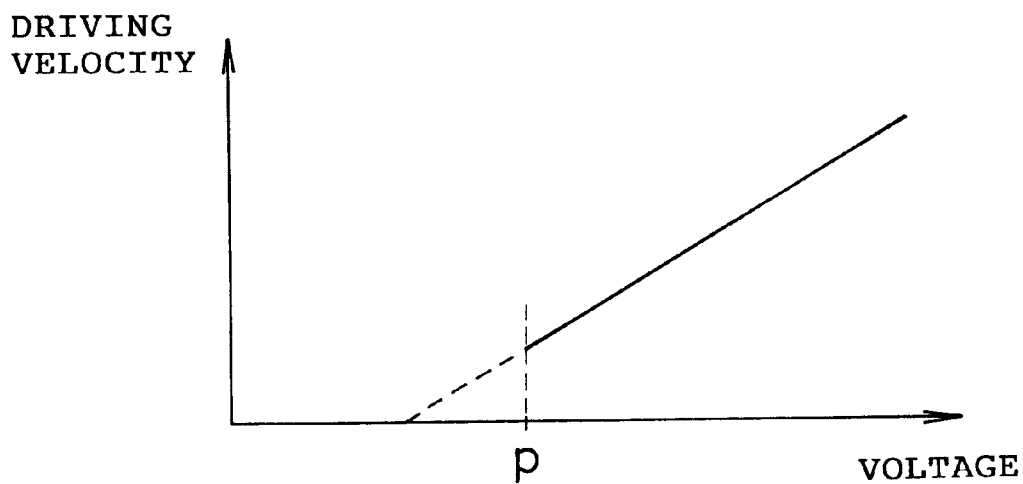
FIG. 1 is a diagram showing relationship between a drive pulse voltage applied on the piezoelectric transducer and driving velocity.
Figure 2:
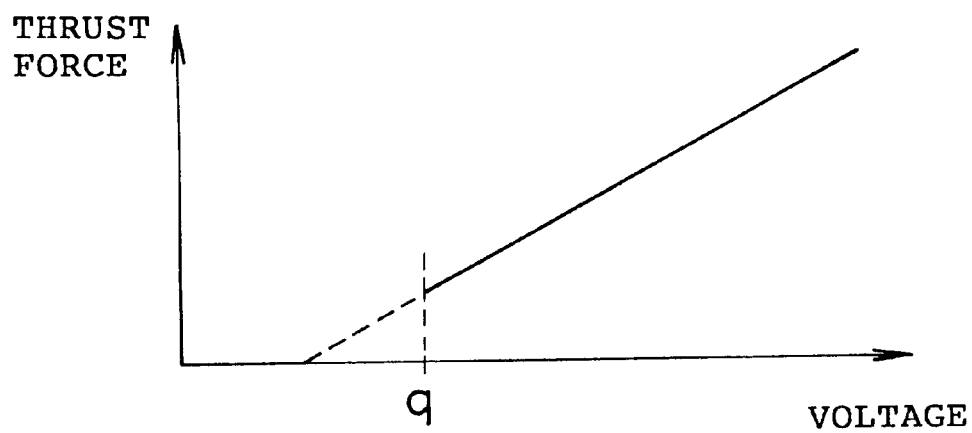
FIG. 2 is a diagram showing relationship between a drive pulse voltage applied on the piezoelectric transducer and a thrust force.
Figure 3:
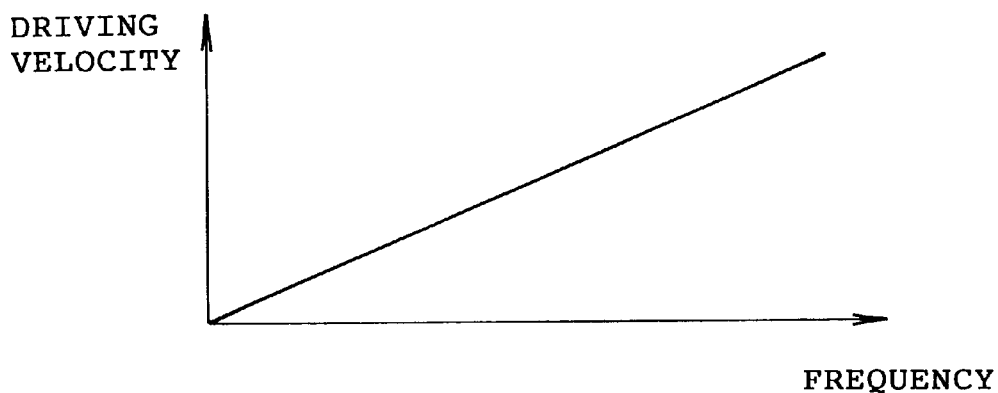
FIG. 3 is a diagram showing relationship between a frequency of drive pulses applied on the piezoelectric transducer and a driving velocity.
Figure 4:
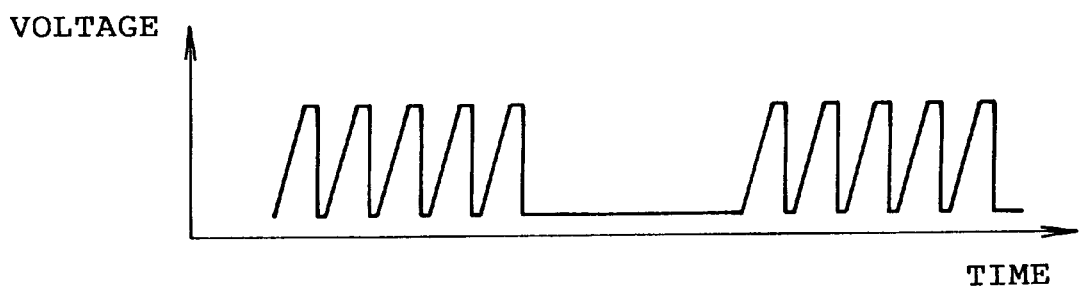
FIG. 4 is a diagram showing a waveform of drive pulses when drive pulses applied on the piezoelectric transducer are thinned out.
Figure 5A:
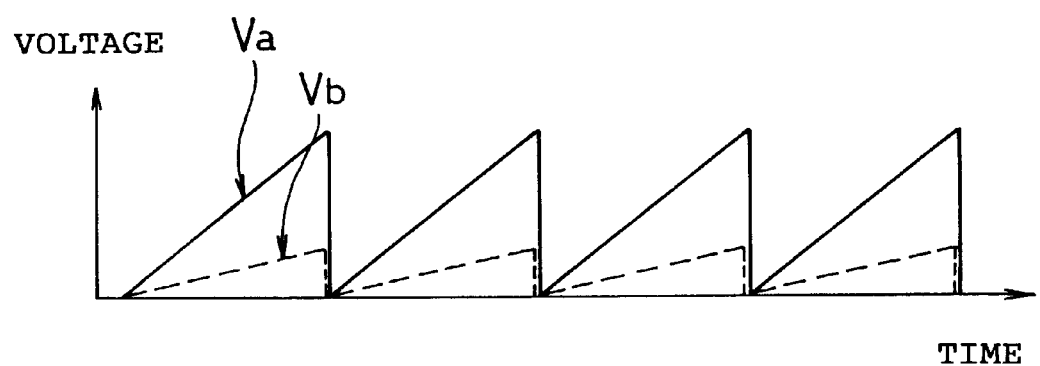
FIGS. 5(a) and 5(b) are diagrams showing relationship between a drive pulse voltage applied on the piezoelectric transducer and displacement.
Figure 5B:
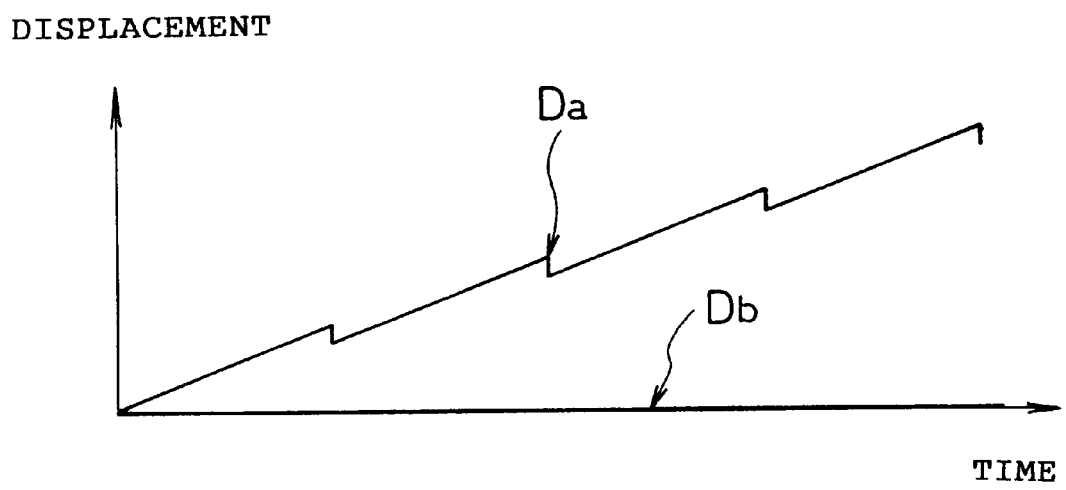

The constant-current driving circuits 45a, 45b, 45c, and 45d are constituted so that the optimum driving current can be obtained in accordance with impedance (electric capacity) which differs with the respective numbers of element lamination layers of piezoelectric transducers 48a, 48b, 48c and 48d divided into a plurality of blocks. For this reason, drive pulses having a predetermined normal voltage waveform, for example, such a normal voltage waveform as shown by a line Va in FIG. 5(a) irrespective of the number of element lamination layers can be applied to each block of the piezoelectric transducers.

The piezoelectric transducer 48 is constituted by stacking a plurality of transducer aggregates each of which has been constituted by stacking one or a plurality of unit piezoelectric elements. The piezoelectric transducer 48 here has been divided into fourblocks: 48a, 48b, 48c and 48d, and the positive electrode of the first block 48a is connected to the constant-current driving circuit 45a through the switching element 47a, that of the second block 48b is connected to the constant-current driving circuit 45b through the switching element 47b, that of the third block 48c is connected to the constant-current driving circuit 45c through the switching element 47c, and that of the fourth block 48d is connected to the constant-current driving circuit 45d through the switching element 47d. The negative electrodes of each block are grounded and are connected to ground terminals of the constant-current driving circuits respectively.

In this respect, If the same voltage is applied on the piezoelectric transducers, the greater the number of lamination layers of an element constituting the piezoelectric transducer is, the larger becomes the expansion, and therefore, the greater the number of lamination layers is, the faster becomes the driving velocity. When, however, the number of lamination layers increases, the resonance frequency of the driving mechanism including the piezoelectric transducer lowers, and therefore vibration sound occurring during driving is within an audio frequency range, and does not only give an unpleasant feeling to the human ear, but also the driving velocity lowers due to the lowered resonance frequency. Thus, there are some cases where driving cannot be made in a ultrasonic wave area. In this respect, the number of lamination layers of the element is limited.

The switching element of the above-described switching circuit 47 is constituted by a semiconductor switching element, and is controlled by a CPU 41 constituting a drive control circuit.

Next, the description will be made of the operation of the drive control circuit 40. A difference between a target lens setting position which has been inputted from outside by means not shown and the current position of the lens detected by a MR sensor 17 is determined by the CPU 41, and it is decided in accordance with the moving distance whether high-velocity driving or low-velocity driving is effected, and which block of the piezoelectric transducer is driven. Thus, control is made so that the switching element of the switching circuit 47 corresponding to a block selected is turned ON. When the difference between a target lens setting position and the current position of the lens detected by the MR sensor 17 has become zero, the switching element is turned OFF to stop the driving.

As described above, the greater the number of lamination layers is, t he faster becomes the driving velocity, and therefore, when effecting high-velocity driving, all four blocks of the first block 48*a* to the fourth block 48*d* of the piezoelectric transducer 48 are driven. To this end, all switching elements 47*a* to 47*d* are turned ON, and the first block 48*a* to the fourth block 48*d* of the piezoelectric transducer are connected to the constant-current driving circuits 45*a*, 45*b*, 45*c* and 45*d* respectively.

For low-velocity driving, only the first block 48*a* of the piezoelectric transducer 48 having a minimum number of lamination layers is driven. To this end, the switching element 48*a* is turned ON and the first block 48*a* is connected to the constant-current driving circuit 45*a*. The other switching elements 47*b*, 48*c* and 47*d* are not connected to the constant-current driving circuit as OFF.

When driving at an intermediate velocity, it will suffice if one block or a combination of plural blocks is selected, in accordance with a desired velocity, from among the first block 48*a*, the second block 48*b*, the third block 48*c* and the fourth block 48*d* for driving. It is possible to select, for example, only the fourth block 48*d* or the second block 48*b* and the third block 48*c* for driving. In this case, when the resonance frequency of the driving mechanism including the piezoelectric transducer is high, stable velocity can be obtained, and therefore, it is preferable to drive a block near to the drive shaft 11 in preference to other blocks.

Figure 17:
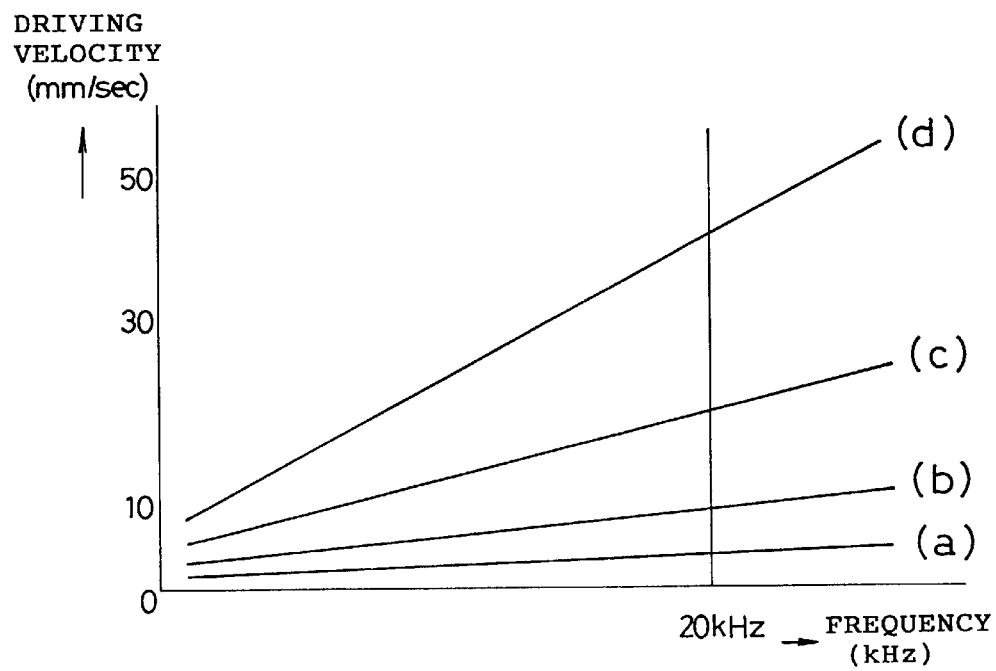
FIG. 17 is a view showing an example of relationship between a driving block of the piezoelectric transducer and driving velocity.
Figure 18:
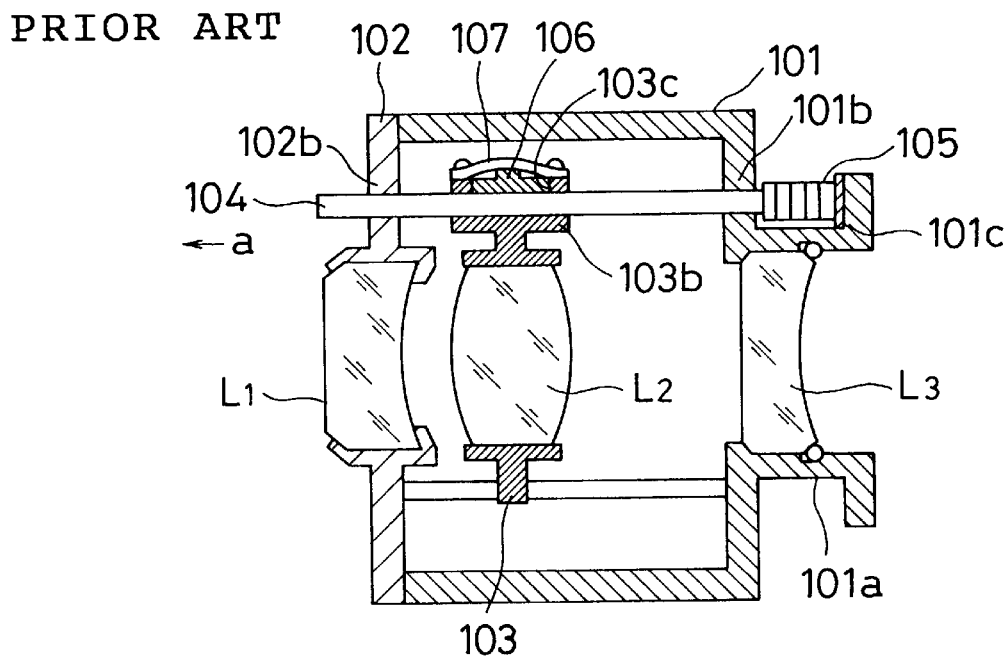
FIG. 18 is a sectional view for explaining an example of lens driving mechanism for cameras using a driving mechanism using a conventional piezoelectric transducer.
Figure 19:
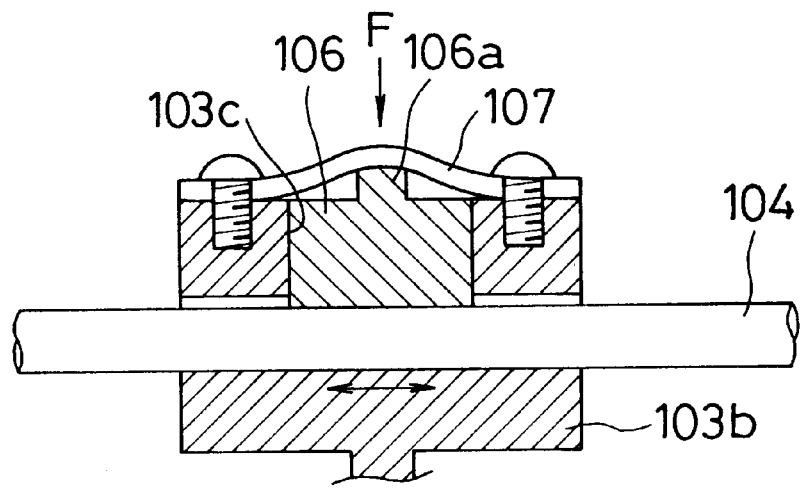
FIG. 19 is a sectional view for showing a frictionally-coupled portion between a drive shaft of a driving mechanism shown in FIG. 15, and a slider block and a pad.
Figure 20:
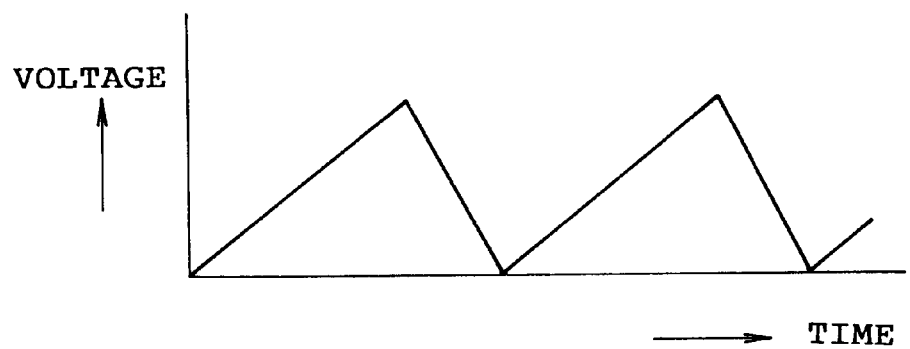
FIG. 20 is a view showing an example of a waveform of drive pulses applied on the piezoelectric transducer.

FIG. 17 is a diagram showing an example of relationship between drive block and driving velocity of the piezoelectric transducer 48, and a line (a) shows a case where the first block 48*a* of the piezoelectric transducer is driven, a line (b) shows a case where the third block 48*c* of the piezoelectric transducer is driven, a line (c) shows a case where the first block 48*a*, the second block 48*b* and the third block 48*c* thereof are driven, and a line (d) shows a case where all four blocks of the first block 48*a* to the fourth block 48*d* thereof are driven.

When the number of blocks constituting such piezoelectric transducer has been changed, the impedance (electric capacity) of the piezoelectric transducer changes, and therefore, mismatching of the impedance occurs when driving through one driving circuit, and the drive pulse voltage applied on the piezoelectric transducer lowers to lower the driving efficiency. To this end, according to the present invention, a plurality of constant-current drive circuits having impedance corresponding to a number of elements constituting blocks of the piezoelectric transducer to be driven are prepared by a number corresponding to the blocks, and it is made possible to always apply appropriate drive pulses by switching the drive circuit in accordance with the number of elements of the blocks driven to prevent the driving efficiency from being lowered.

As described above in detail, according to the present invention, in a drive device using an electromechanical transducer, the electromechanical transducer is constituted by a plurality of blocks, and design has been made such that the optimum block is selectively driven in accordance with a desired driving velocity in the case of high-velocity driving or a desired moving distance in the case of low-velocity driving. Therefore, it is possible to effectively adjust the driving velocity or moving distance without causing lowered thrust force (driving force) and unstable driving velocity.

In the case of high-velocity driving, only a part of the plurality of blocks of the electromechanical transducer is controlled so as to be driven, and therefore, it is possible to prevent vibration sound of audio frequency due to lowered resonance frequency of a driving system from occurring. In the case of low-velocity driving, since there is not any fear of causing vibration sound of audio frequency, it is possible to select one or all blocks in accordance with the desired moving distance, and to effectively move over a long moving distance.

Against fluctuation in impedance of an electromechanical transducer resulting from change in the number of elements constituting the electromechanical transducer, it is adjusted by the impedance adjusting means so as to adapt to the impedance of the driving circuit, and therefore, it can be effectively driven without lowering the thrust force even if the number of elements is changed.

When preparing a plurality of constant-current driving circuits corresponding to different impedance by the number of lamination layers of a transducer aggregate, if the transducer aggregates are appropriately selected and combined in accordance with the desired driving velocity and a constant-current driving circuit adapted to the appropriately-combined transducer aggregate is driven, it will be possible to set the driving velocity over a wide range from high-velocity driving to low-velocity driving, and yet to maintain high driving efficiency.

What is claimed is:

1. A drive device, comprising:
   an electromechanical transducer including a plurality of blocks;
   a driving member coupled with said electromechanical transducer for being displaced together with said electromechanical transducer;
   a moving member frictionally coupled with said driving member, for moving in accordance with a displacement of said driving member;
   a driving source for giving electric pulses to said electromechanical transducer to cause said electromechanical transducer to expand and contract; and
   a controller for selectively connecting a block of said electromechanical transducer to said driving source to provide a desired moving velocity.

2. A drive device as claimed in claim 1, wherein when selecting a predetermined block from among said plurality of electromechanical transducer blocks in accordance with a desired driving velocity to connect it to said driving source,
   said controller controls said electromechanical transducer so as to select a block nearest to said driving member in preference to other blocks for connecting said nearest block to said driving source.

3. A drive device as claimed in claim 1, wherein said electromechanical transducer includes a plurality of blocks each comprising a number of lamination layers, wherein a number of lamination layers in a block nearest said driving member is a minimum and a number of lamination layers of said blocks increases as a function of the distance of said blocks from said driving member.

4. A drive device as claimed in claim 3, wherein each block includes at least one unit element comprising a number of lamination layers, and a number of unit elements of said blocks successively increases exponentially as a function of the distance of said blocks from said driving member.

5. A drive device, comprising:
   an electromechanical transducer including a plurality of blocks;
   a driving member coupled with said electromechanical transducer for being displaced together with said electromechanical transducer;
   a moving member frictionally coupled with said driving member, for moving in accordance with displacement of said driving member;
   a driving source for giving electric pulses to said electromechanical transducer to cause said electromechanical transducer to expand and contract; and
   a controller for selectively connecting a block of said electromechanical transducer to said driving source in accordance with a desired movement;
   wherein said controller controls said electromechanical transducer so as to connect a block nearest said driving member to said driving source so as to be always used when selecting a predetermined block from among said plurality of electromechanical transducer blocks.

6. A drive device as claimed in claim 5, wherein said electromechanical transducer includes a plurality of blocks each having a number of lamination layers, wherein a number of lamination layers of a block nearest said driving member is a minimum and a number of lamination layers of the blocks increases as a function of a block's distance from said driving member.

7. A drive device as claimed in claim 6, wherein each block includes at least one unit element comprising a number of lamination layers, and a number of unit elements of said blocks successively increases exponentially as a function of a block's distance from said driving member.

8. A drive device, comprising:
   an electromechanical transducer including a plurality of blocks;
   a driving member coupled with said electromechanical transducer for being displaced together with said electromechanical transducer;
   a moving member frictionally coupled with said driving member, for moving in accordance with displacement of said driving member;
   a driving source for giving electric pulses to said electromechanical transducer to cause said electromechanical transducer to expand and contract;
   a velocity indicating unit tor indicating a moving velocity of said moving member; and
   a controller for connecting only some blocks of said electromechanical transducer to said driving source when movement at higher velocity than a predetermined velocity is indicated.

9. A drive device as claimed in claim 8, wherein said controller controls said electromechanical transducer so as to connect some or all blocks of said plurality of electromechanical transducers to said driving source in accordance with a desired moving distance in the case of low-velocity driving.

10. A drive device as claimed in claim 8, wherein said controller controls said electromechanical transducer so as to connect a block nearest said driving member to said driving source in preference to other blocks when connecting only blocks of a part of said plurality of electromechanical transducers to said driving source for indicated high-velocity driving.

11. A drive device as claimed in claim 8, wherein each block of said electromechanical transducer is constituted by stacking one or more lamination layers.

12. A drive device as claimed in claim 8, wherein said electromechanical transducer is constituted by a plurality of blocks each having different numbers of lamination layers.

13. A drive device, comprising:
   an electromechanical transducer consisting of a plurality of blocks;
   a driving member coupled with said electromechanical transducer for being displaced together with said electromechanical transducer;
   a moving member frictionally coupled with said driving member, for moving in accordance with displacement of said driving member;
   a driving source for giving electric pulses to said electromechanical transducer to cause said electromechanical transducer to expand and contract;
   an impedance adjusting means for adjusting the impedance which fluctuates by a selected block so as to adapt said electromechanical transducer to the impedance of said driving source; and
   a controller for selectively connecting a block of said electromechanical transducer to said driving source.

14. A drive device as claimed in claim 13, wherein said impedance adjusting means provided at said electromechanical transducer includes a plurality of impedance adjusting circuits and switching means for selectively connecting said plurality of impedance adjusting circuits to said electromechanical transducer.

15. A drive device as claimed in claim 14, wherein each of said plurality of impedance adjusting circuits includes a plurality of impedance circuits having impedance corresponding to the impedance of a plurality of blocks of said electromechanical transducer.

16. A drive device, comprising:
   an electromechanical transducer including a plurality of selectable blocks;
   a driving member coupled with said electromechanical transducer for being displaced together with said electromechanical transducer;
   a moving member frictionally coupled with said driving member, for moving in accordance with displacement of said driving member;
   a plurality of constant-current circuits for giving electric pulses to said electromechanical transducer to cause said electromechanical transducer to expand and contract, said plurality of constant-current circuits providing currents which are adapted to respective differing impedance characteristics of said selectable blocks; and
   a controller for selectively connecting said electromechanical transducer to selected ones of said plurality of constant current circuits.

17. A drive device as claims in claim 16, wherein said electromechanical transducer includes a plurality of blocks having different numbers of lamination layers.

18. A drive device as claimed in claim 16, wherein said controller controls said electromechanical transducer so as to select a predetermined block from a plurality of transducer aggregates in accordance with a designated driving velocity and to connect a constant-current driving circuit corresponding to the block thus selected.

19. An apparatus having a mobile element, comprising:

an electromechanical transducer including a plurality of blocks;

a driving member coupled with said electromechanical transducer for being displaced together with said electromechanical transducer;

a moving member interlocked with said mobile element and frictionally coupled with said driving member, for moving together with said mobile element, in accordance with a displacement of said driving member;

a driving source for giving electric pulses to said electromechanical transducer to cause said electromechanical transducer to expand and contract; and a controller for selectively connecting a block of said electromechanical transducer to said driving source to provide a desired moving velocity.

20. An apparatus as claimed in claim 19, wherein said apparatus is a lens barrel and said mobile element is a lens unit.

21. An apparatus having a mobile element, comprising:

an electromechanical transducer including a plurality of blocks;

a driving member coupled with said electromechanical transducer for being displaced together with said electromechanical transducer;

a moving member interlocked with said mobile element and frictionally coupled with said driving member, for moving together with said mobile element, in accordance with displacement of said driving member;

a driving source for giving electric pulses to said electromechanical transducer to cause said electromechanical transducer to expand and contract; and a controller for selectively connecting a block of said electromechanical transducer to said driving source in accordance with a desired movement;

wherein said controller controls said electromechanical transducer so as to connect a block nearest said driving member to said driving source so as to be always used when selecting a predetermined block from among said plurality of electromechanical transducer blocks.

22. An apparatus as claimed in claim 21, wherein said apparatus is a lens barrel and said mobile element is a lens unit.

23. An apparatus having a mobile element, comprising:

an electromechanical transducer including a plurality of blocks;

a driving member coupled with said electromechanical transducer for being displaced together with said electromechanical transducer;

a moving member interlocked with said mobile element and frictionally coupled with said driving member, for moving together with said mobile element, in accordance with displacement of said driving member;

a driving source for giving electric pulses to said electromechanical transducer to cause said electromechanical transducer to expand and contract;

a velocity indicating unit for indicating a moving velocity of said moving member; and a controller for connecting only some blocks of said electromechanical transducer to said driving source when movement at higher velocity than a predetermined velocity is indicated.

24. An apparatus as claimed in claim 23, wherein said apparatus is a lens barrel and said mobile element is a lens unit.

25. An apparatus having a mobile element, comprising:

an electromechanical transducer including a plurality of blocks;

a driving member coupled with said electrolmechanical transducer for being displaced together with said electromechical transducer;

a moving member interlocked with said mobile element and frictionally coupled with said driving member, for moving together with said mobile element, in accordance with displacement of said driving member;

a driving source for giving electric pulses to said electromechanical transducer to cause said electromechanical transducer to expand and contract;

an impedance adjusting means for adjusting the impedance which fluctuates by a selected block so as to adapt said electromechanical transducer to the impedance of said driving source; and a controller for selectively connecting a block of said electromechanical transducer to said driving source.

26. An apparatus having a mobile element, comprising:

an electromechanical transducer having a plurality of selectable blocks;

a driving member coupled with said electromechanical transducer for being displaced together with said electromechanical transducer;

a moving member interlocked with said mobile element and frictionally coupled with said driving member, for moving together with said mobile element in accordance with displacement of said driving member;

a plurality of constant-current circuits for giving electric pulses to said electromechanical transducer to cause said electromechanical transducer to expand and contract, said plurality of constant-current circuits providing currents which are adapted to respective differing impedance characteristics of said selectable blocks; and a controller for selectively connecting said electromechanical transducer to selected ones of said plurality of constant current circuits.

27. An apparatus as claimed in claim 26, wherein said apparatus is a lens barrel and said mobile element is a lens unit.

28. A drive device comprising:

an electromechanical transducer consisting of a plurality of blocks;

a driving member coupled with said electromechanical transducer for being displaced together with said electromechanical transducer;

a moving member frictionally coupled with said driving member for moving in accordance with displacement of said driving member;

a driving source for giving electric pulses to said electromechanical transducer to cause said electromechanical transducer to expand and contract;

an impedance adjusting means for adjusting the impedance which fluctuates by a selected block so as to adapt said electromechanical transducer to the impedance of said driving source; and a controller for selectively connecting a block near to the driving member of said electromechanical transducer to said driving source.

29. An apparatus having a mobile element, comprising:

an electromechanical transducer including a plurality of blocks;

a driving member coupled with said electromechanical transducer for being displaced together with said electromechanical transducer;

a moving member interlocked with said mobile element and frictionally coupled with said driving member, for moving together with said mobile element, in accordance with displacement of said driving member;

a driving source for giving electric pulses to said electromechanical transducer to cause said electromechanical transducer to expand and contract;

an impedance adjusting means for adjusting the impedance which fluctuates by a selected block so as to adapt said electromechanical transducer to the impedance of said driving source; and a controller for selectively connecting a block near to the driving member of said electromechanical transducer to said driving source.

30. A drive device comprising:

an electromechanical transducer consisting of a plurality of blocks;

a drive member coupled with said electromechanical transducer for being displaced together with said electromechanical transducer;

a friction member frictionally coupled with said driving member and moves relatively to said driving member by frictional force;

a driving source for giving electric pulses to said electromechanical transducer to cause said electromechanical transducer to expand and contract; and a controller for selectively connecting a plurality of blocks of said electromechanical transducer to said driving source to provide a desired moving velocity.

31. A drive device comprising:

an electromechanical transducer consisting of a plurality of blocks;

a drive member coupled with said electromechanical transducer for being displaced together with said electromechanical transducer;

a friction member frictionally coupled with said driving member and moves relatively to said driving member by frictional force;

a driving source for giving electric pulses to said electromechanical transducer to cause said electromechanical transducer to expand and contract; and a controller for selectively connecting a plurality of blocks of said electromechanical transducer to said driving source in accordance with a desired movement;

wherein said controller controls said electromechanical transducer so as to connect a block nearest said drive member to said driving source so as to be always used when selecting a predetermined block from among said plurality of electromechanical transducer blocks.

* * * * *